(12) United States Patent
Shin et al.

(10) Patent No.: US 6,417,900 B1
(45) Date of Patent: Jul. 9, 2002

(54) LIQUID CRYSTAL DISPLAY UNIT WITH CONDUCTIVE LIGHT-SHIELDING MEMBER HAVING SUBSTANTIALLY THE SAME POTENTIAL AS COMMON ELECTRODE

(75) Inventors: Hyunho Shin, Kyonki-Do (KR); Kuniaki Suzuki; Chae Gee Sung, both of Miyagi-ken (JP)

(73) Assignee: LG. Philips LCD Co., Ltd., Seoul (KR)

( * ) Notice: Subject to any disclaimer, the term of this patent is extended or adjusted under 35 U.S.C. 154(b) by 0 days.

(21) Appl. No.: 09/044,568

(22) Filed: Mar. 19, 1998

(30) Foreign Application Priority Data

Mar. 21, 1997 (JP) ............................................. 9-068718

(51) Int. Cl.[7] ...................... G02F 1/1333; G02F 1/1337
(52) U.S. Cl. ........................ 349/110; 349/111; 349/123; 349/130
(58) Field of Search ................................ 349/110, 111, 349/123, 130

(56) References Cited

U.S. PATENT DOCUMENTS

| | | | | |
|---|---|---|---|---|
| 5,459,596 A | * | 10/1995 | Ueda et al. ................... 359/59 |
| 5,608,556 A | * | 3/1997 | Koma ......................... 349/143 |
| 5,658,492 A | * | 8/1997 | Murashiro et al. ........... 349/184 |
| 5,666,179 A | * | 9/1997 | Koma ......................... 349/130 |
| 5,786,876 A | * | 7/1998 | Ota et al. ................... 349/110 |
| 5,805,247 A | * | 9/1998 | Oh-e et al. .................. 349/110 |
| 5,870,158 A | * | 2/1999 | Abe et al. ................... 349/111 |
| 5,907,379 A | * | 5/1999 | Kim et al. ................... 349/141 |
| 6,271,903 B1 | * | 8/2001 | Shin et al. .................. 349/110 |

FOREIGN PATENT DOCUMENTS

JP          1-88520         4/1989

\* cited by examiner

Primary Examiner—William L. Sikes
Assistant Examiner—Tarifur R Chowdhury
(74) Attorney, Agent, or Firm—Brinks Hofer Gilson & Lione

(57) ABSTRACT

A liquid crystal display unit has wider viewing angles and a brighter display. In this display unit, an alignment film is not required to be processed for alignment of a liquid crystal, thereby simplifying the manufacturing process. A first substrate and a second substrate are disposed such that they face each other. A liquid crystal having a negative anisotropy of dielectric constant is provided between the substrates. A common electrode and an alignment film which has a pretilt angle of 90°±1° and which is not rubbed are sequentially disposed on the surface of the first substrate facing the second substrate. A plurality of pixel electrodes are provided on the surface of the second substrate facing the first substrate so as to cover a display area of the liquid crystal. A conductive light-shielding member is disposed on the second substrate and positioned around each of the pixel electrodes in a non-display area of the liquid crystal. The conductive light-shielding member is electrically insulated from the pixel electrode. An alignment film which has a pretilt angle of 90°±1° and which is not rubbed is formed on the pixel electrodes and on the light-shielding members. The conductive light-shielding member is set at substantially the same potential as the common electrode.

4 Claims, 13 Drawing Sheets

Vsig = 5.5V
Vcom = VBM = GND

Vsig = 5.5V
Vcom = GND
VBM = FLOATING

BACKLIGHT

A : DIRECTION IN WHICH UPPER SUBSTRATE IS RUBBED

B : DIRECTION IN WHICH LOWER SUBSTRATE IS RUBBED

AREA HAVING CR ≧ 10

LIQUID CRYSTAL DISPLAY UNIT WITH CONDUCTIVE LIGHT-SHIELDING MEMBER HAVING SUBSTANTIALLY THE SAME POTENTIAL AS COMMON ELECTRODE

BACKGROUND OF THE INVENTION

1. Field of the Invention

The present invention generally relates to liquid crystal display units having wider viewing angles.

2. Description of the Related Art

FIG. 16 illustrates an example of the configuration of a liquid crystal display unit. In the liquid crystal display unit H shown in FIG. 16, a twisted nematic (TN) liquid crystal 3 is disposed between opposing lower and upper substrates 1 and 2, and polarizers 4 and 5 are placed on the exterior of the upper and lower substrates 2 and 1, respectively. A thin-film-transistor-type liquid crystal display unit H is configured as follows. A source wiring pattern 6 and a gate wiring pattern 7 are provided in a matrix form on the lower substrate 1. A thin film transistor 8 and a pixel electrode 9, both of which serve as a switching device, are provided in an area where the source wiring pattern 6 and the gate wiring pattern 7 intersect with each other. Moreover, a color filter 10 and a common electrode 11 are disposed on the upper substrate 2. A potential difference is provided between the pixel electrode 9 and the corresponding region of the common electrode 11 in each matrix area so as to apply a certain electric field to the liquid crystal 3 between the two electrodes. The alignment of the liquid crystal 3 is thus controlled.

Further, in the liquid crystal display unit H of the above type, an alignment film (not shown) is provided on the upper surface of the lower substrate 1 next to the liquid crystal 3 and on the lower surface of the upper substrate 2 next to the liquid crystal 3 so as to control the alignment of the liquid crystal molecules when an electric field is not applied. The alignment film provided on the lower substrate 1 shown in FIG. 16 is rubbed in the direction indicated by the arrow B shown in FIG. 17, while the alignment film disposed on the upper substrate 2 illustrated in FIG. 16 is rubbed in the direction indicated by the arrow A illustrated in FIG. 17.

Accordingly, in the liquid crystal display unit H shown in FIG. 16, when an electric field is not applied to the liquid crystal 3, the liquid crystal molecules which are homogeneously aligned between and parallel to the substrates 1 and 2 are twisted through 90°. On the other hand, when an electric field is applied to the liquid crystal 3, the liquid crystal molecules are aligned between and perpendicularly to the substrates 1 and 2 in the direction along the electric field. Thus, the liquid crystal display unit H is switched between a bright state and a dark state by alternately allowing light emitted from a backlight in the direction from below the lower substrate 1 to pass through the liquid crystal display unit H or blocking it.

However, the TN-mode liquid crystal display unit of the above type presents the problem of the viewing angle dependency. FIG. 18 illustrates a typical viewing angle dependency of the TN-mode liquid crystal display unit, and the hatched portion indicates an area having a contrast (CR) of 10 or greater. FIG. 18 reveals that the TN-mode liquid crystal display unit exhibits a poor visibility as viewed from the vertical (up and down) direction, in particular, from above, though the visibility in the horizontal (left and right) direction is satisfactory.

In the above background, various structures for increasing the viewing angles of a liquid crystal have been proposed.

Hitherto, in a technique for widening the viewing angles of the above type of liquid crystal display unit, the following structure is known in which the orientations of alignment of the liquid crystal molecules are differentiated between a plurality of regions of each pixel. In this structure, each pixel has a plurality of domains (areas) where the liquid crystal molecules are aligned perpendicularly to the substrates in different orientations when a voltage is applied to the molecules. In this structure, each pixel is usually divided into two domains, and the alignment film portions corresponding to the divided two domains are processed for alignment of the liquid crystal in the different orientations. By virtue of this structure, a sharp and asymmetrical change in the contrast in the vertical direction, which is conventionally encountered by the TN-mode liquid crystal display unit, is alleviated and then becomes symmetrical, thereby inhibiting the inversion of halftones. It is thus expected that a liquid crystal display unit having wider viewing angles will be provided.

In order to implement this structure, however, it is necessary that an alignment film, which is used for controlling the alignment of the liquid crystal, be divided into a plurality of very small areas for each miniscule pixel, and that the divided areas of the alignment film be processed to effect the different orientations of the alignment of the liquid crystal. It is, however, very difficult to process the divided areas of the alignment film in accordance with the divided pixel regions, thereby lowering the yield and increasing the complexity of the manufacturing process.

SUMMARY OF THE INVENTION

Accordingly, in view of the above background, it is an object of the present invention to provide a liquid crystal display unit which exhibits wider viewing angles and a brighter display, and in which the need for processing alignment film for the alignment of a liquid crystal is eliminated so as to simplify the manufacturing process.

In order to achieve the above object, according to the present invention, there is provided a liquid crystal display unit including a first substrate and a second substrate disposed in such a manner that they face each other. A liquid crystal having a negative anisotropy of dielectric constant is disposed between the first and second substrates. A common electrode and an alignment film which has a pretilt angle of 90°±1° and which is not rubbed are sequentially disposed on the surface of the first substrate facing the second substrate. A plurality of pixel electrodes are disposed on the surface of the second substrate facing the first substrate so as to cover a display area of the liquid crystal. A conductive light-shielding member is disposed on the second substrate and is positioned around each of the plurality of pixel electrodes in a non-display area of the liquid crystal while being electrically insulated from the pixel electrode. The conductive light-shielding member is set at substantially the same potential the said common electrode. An alignment film which has a pretilt angle of 90°±1° and which is not rubbed disposed on the pixel electrodes and on the conductive light-shielding members.

In the foregoing liquid crystal display unit, an optical compensator may be provided for at least one of the first and second substrates.

As discussed above, the liquid crystal having a negative anisotropy of dielectric constant is disposed between alignment films which have a pretilt angle of 90°±1° and which are not rubbed (which are not processed for alignment of the liquid crystal). Accordingly, when an electric field is not applied, the long axis of the liquid crystal is aligned perpendicularly to the alignment films. In contrast, upon application of an electric field generated from pixel electrodes, the long axis of the liquid crystal is homogeneously aligned between the alignment films. Since the liquid crystal molecules are positioned perpendicularly to the alignment films which are not particularly processed for alignment for the liquid crystal, they are not tilted in a specific direction when they are homogeneously aligned between the alignment films. Thus, the liquid crystal molecules are tilted in any given direction when they are homogeneously aligned upon application of an electric field, thereby resulting in the formation of a plurality of domains. As a consequence, the liquid crystal molecules are aligned in specific orientations by being tilted in any given directions upon application of an electric field.

Moreover, the liquid crystal has a negative dielectric constant, and the conductive light-shielding member is set substantially at the same potential as the common electrode. Accordingly, the electric lines of force produced by an electric field generated from the pixel electrodes are extended around the pixel electrodes while being attracted to the conductive light-shielding member provided around the pixel electrodes. Thus, the liquid crystal molecules are aligned perpendicularly to the extended electric lines of force, resulting in the formation of a plurality of domains for each pixel. The liquid crystal molecules are homogeneously aligned while having slightly different tilted angles for the individual domains.

Therefore, a sharp and asymmetrical change in the contrast in the vertical direction of the liquid crystal display unit is reliably eased and then becomes symmetrical, thereby suppressing the inversion of halftones.

The light-shielding member is grounded, thereby making it possible to divide each pixel into a plurality of domains without needing to divide an alignment film into a plurality of portions corresponding to the divided domains. Hence, the above advantages of the present invention are obtained without particularly processing alignment films for alignment of the liquid crystal. The liquid crystal display unit of the present invention can thus be manufactured more easily than the conventional ones having the above-described structure, thereby simplifying the manufacturing process.

DESCRIPTION OF THE PREFERRED EMBODIMENT

Figure 1:
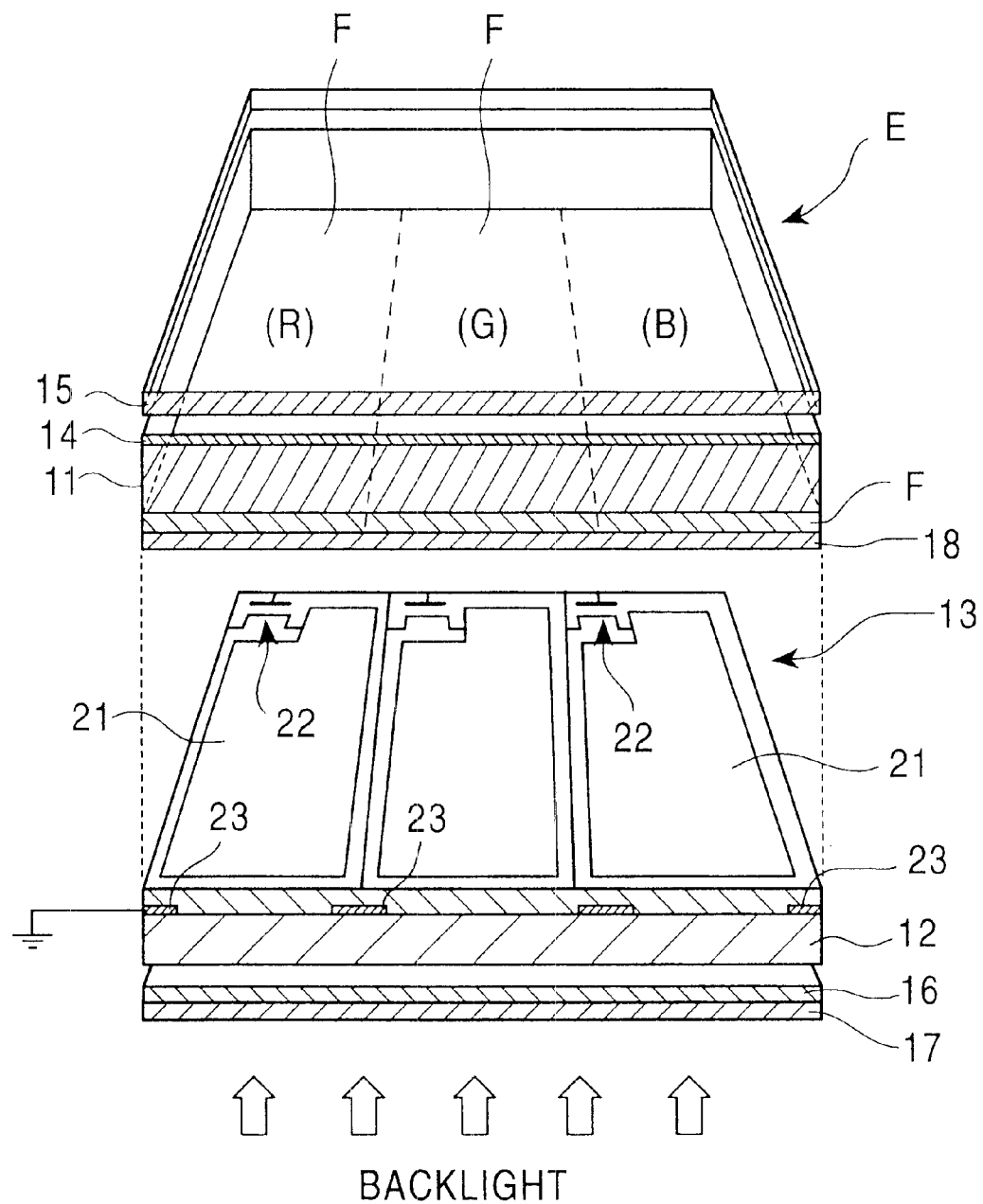
FIG. 1 is an exploded perspective view illustrating a liquid crystal display unit partly in cross section according to an embodiment of the present invention.
Figure 2:
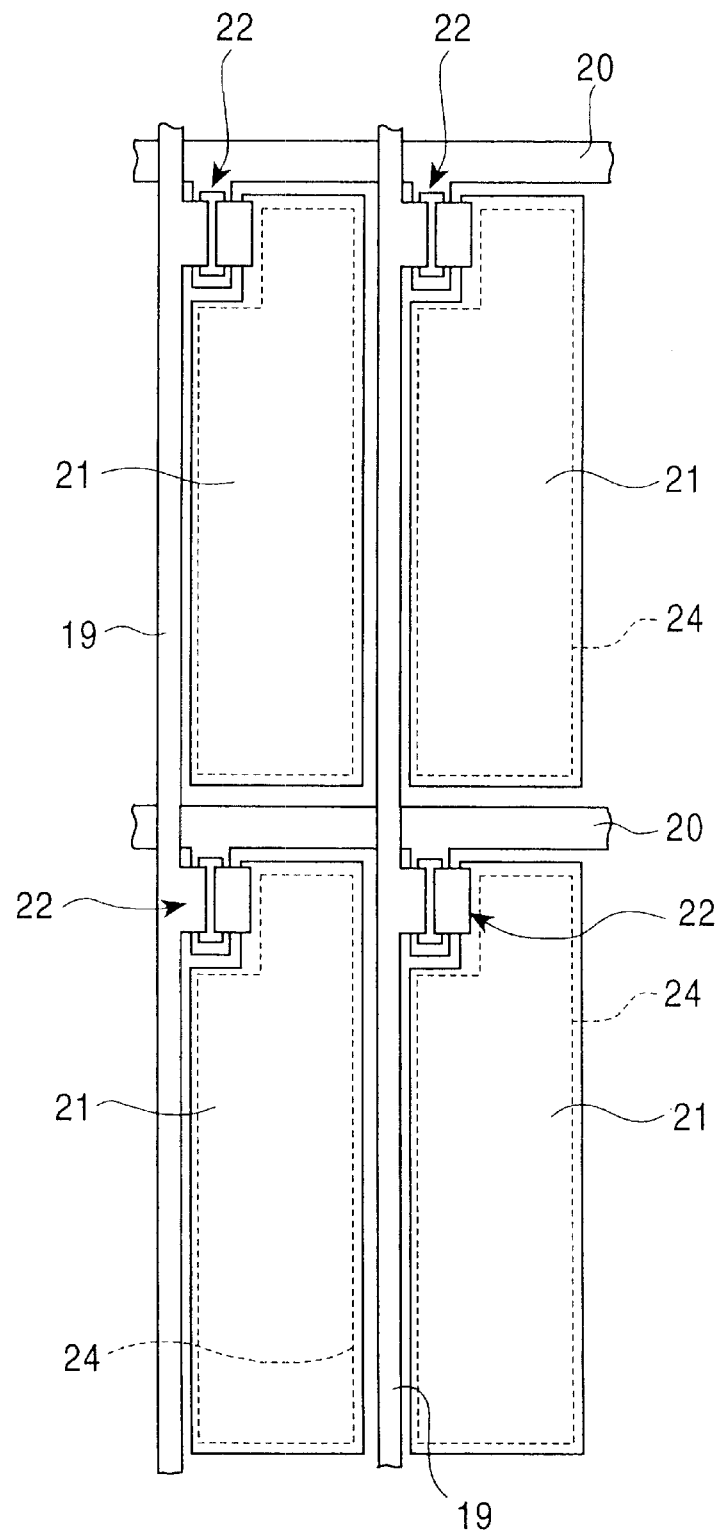
FIG. 2 is a plan view illustrating the arrangement of source-drain wiring patterns, thin film transistors, and pixel electrodes used in the liquid crystal display unit shown in FIG. 1.
Figure 3A:
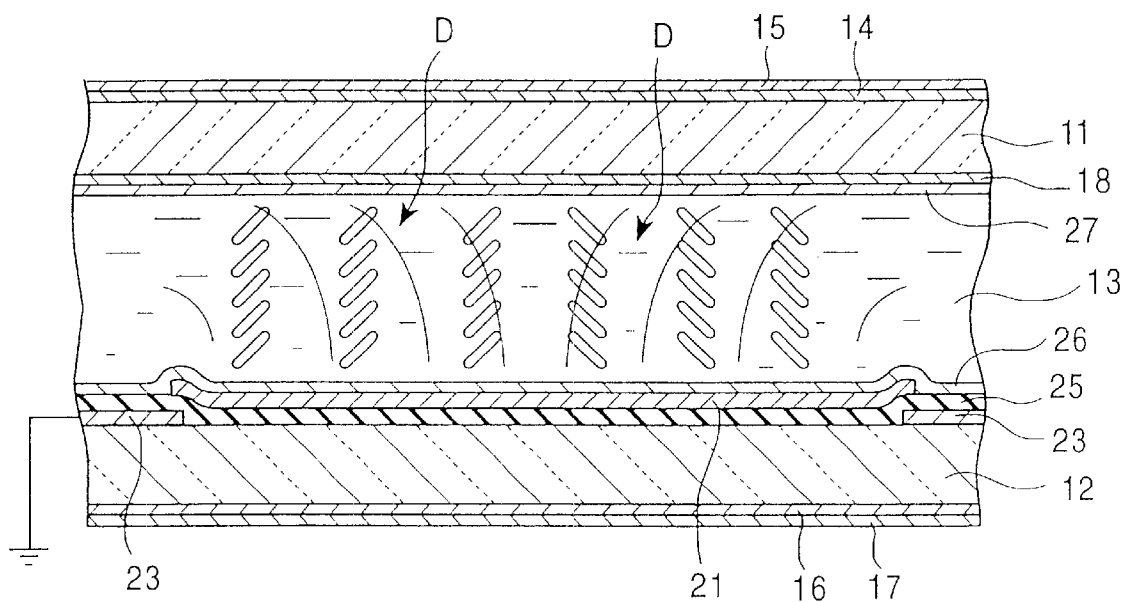
FIG. 3A is a fragmentary sectional view illustrating the liquid crystal display unit shown in FIGS. 1 and 2.

An embodiment of the present invention is explained below with reference to FIGS. 1 through 3. FIG. 1 is a perspective view schematically illustrating a liquid crystal display unit partially in cross section according to an embodiment of the present invention. FIG. 2 is a plan view illustrating the arrangement of thin film transistors and pixel electrodes used in the liquid crystal display unit shown in FIG. 1. FIG. 3A is a sectional view illustrating the essential portion of the liquid crystal display unit shown in FIG. 1.

In the liquid crystal display unit E shown in FIGS. 1 through 3, a liquid crystal 13 is disposed with a predetermined cell gap between transparent upper and lower substrates 11 and 12 which are located in such a manner that they face each other. A phase plate (optical compensator) 14 and a polarizer 15 are provided on the upper surface of the upper substrate 11, and a phase plate (optical compensator) 16 and a polarizer 17 are disposed on the lower surface of the lower substrate 12. Moreover, a color filter F and a common electrode layer 18 are laminated on the lower surface of the upper substrate 11 next to the liquid crystal 13. Further, a source wiring pattern 19 and a gate wiring pattern 20 are provided in a matrix form on the upper surface of the lower substrate 12 closer to the liquid crystal 13. A pixel electrode 21, which is formed of a transparent conductive material, such as indium tin oxide (ITO), is provided in each region surrounded by the source wiring pattern 19 and the gate wiring pattern 20. Further, a thin film transistor 22, which serves as a switching device to be connected to the source wiring pattern 19 and the gate wiring pattern 20, is connected to each pixel electrode 21.

In the configuration of the liquid crystal display unit E illustrated in FIG. 1, only three pixels are shown among a plurality of pixels provided for the liquid crystal display unit E. A pixel electrode 21 is, however, provided for each pixel of the liquid crystal display unit E, and a filter having a prescribed color among the three primary colors such as red (R), green (G), and blue (B) is disposed for each pixel, thereby forming the color filter F.

Then, a black matrix (conductive light-shielding member) 23 is provided at the peripheral portion of each pixel electrode 21 on the lower substrate 12 to shield the non-display area, which blocks the light from entering the liquid crystal 13, such as the source wiring pattern 19, the gate wiring pattern 20, and the thin film transistor 22. The black matrix 23 is formed of a light-shielding and conductive metal film made from Cr or Mo. A plurality of transparent apertures 24, whose outline is slightly smaller than the pixel electrode 21, are formed at equal pitches in the metal film. The apertures 24 are then positioned on the pixel electrodes 21 to form the black matrix 23 on the lower substrate 12, as illustrated in FIG. 3A. The pixel electrode 21 is then provided, as shown in FIG. 3A, on the black matrix 23 with an insulating film 25 therebetween.

The outlines formed by a plurality of apertures 24 positioned on the pixel electrodes 21 are indicated by the dashed lines in FIG. 2. The inside portion within the region surrounded by the dashed lines designates a display area which transmits light, while the outside portion (the source wiring pattern 19, the gate wiring pattern 20, the thin film transistor 22, and the peripheral portion of the above areas) around the above region defines a non-display area which does not transmit light.

The black matrix 23 is grounded and is thus set to be a ground potential even when the pixel electrodes 21 are driven. It is preferable that the black matrix 23 is constantly set to be a ground potential, but the potential of the black matrix 23 may vary in a range of ±0.5 V, in which case, the achievement of the objects of the present invention is not hampered. Thus, the potential of the black matrix 23 may range from −0.5 V to +0.5 V. Additionally, the black matrix 23 is easily grounded by forming a circuit on the substrates 11 and 12 through which the black matrix 23 is connected to the common electrode layer 18. Alternatively, the black matrix 23 may be connected to the common electrode layer 18 via a switch.

An alignment film 26 is formed on the pixel electrode 21 provided for the lower substrate 12 in such a manner that it is in contact with the liquid crystal 13, and an alignment film 27 is also provided on the common electrode layer 18 provided for the upper substrate 11 in such a manner that it is in contact with the liquid crystal 13. The alignment films 26 and 27 are not specifically processed for alignment of the liquid crystal 13, which would be normally processed by rubbing, and the pretilt angle of the alignment films 26 and 27 is set to be 90°±1°.

The liquid crystal 13 has a negative anisotropy of dielectric constant ($\Delta\epsilon$), i.e., a torque which acts on the liquid crystal 13 causes it to be aligned perpendicularly to an electric field. Consequently, according to the structure of the liquid crystal display unit E in cross section shown in FIG. 3A, when an electric field is not applied, the long axis of liquid crystal molecules is aligned substantially orthogonal to the alignment films 26 and 27 in accordance with the pretilt angle of the alignment films 26 and 27. Conversely, upon application of an electric field, the liquid crystal molecules are homogeneously aligned between and substantially parallel to the alignment films 26 and 27 while being slightly tilted.

Figure 3B:
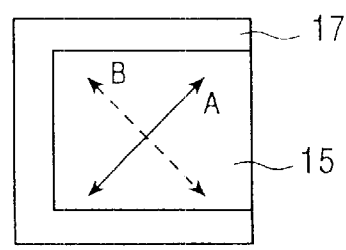
FIG. 3B illustrates the orientations of the polarization axes of the polarizers used in the liquid crystal display unit shown in FIGS. 1 and 2.

The polarization axis of the polarizer 17 provided for the lower substrate 12 is oriented as indicated by the arrow B of FIG. 3B, while the polarization axis of the polarizer 15 provided for the upper substrate 11 is oriented as indicated by the arrow A of FIG. 3B.

In the liquid crystal display unit E of this embodiment, as well as in ordinary liquid crystal display units, the display is switched between on and off states by applying or not applying an electric field between the pixel electrode 21 and the common electrode layer 18. When an electric field is not applied to the liquid crystal 13, the liquid crystal molecules between the substrates 11 and 12 are aligned substantially orthogonal to the alignment films 26 and 27. On the other hand, upon application of an electric field to the liquid crystal 13, the liquid crystal molecules are homogeneously aligned substantially parallel to the alignment films 26 and 27 while being slightly tilted, as shown in FIG. 3A. Since the black matrices 23 are grounded, as discussed above, electric lines of force generated from the pixel electrodes 21 are radially distorted, as illustrated in FIG. 3A, while being attracted to the black matrices 23 formed around the pixel electrodes 21. Hence, since torque acts on the liquid crystal molecules in the direction perpendicular to the radially distorted electric lines of force, the liquid crystal molecules are homogeneously aligned while forming a plurality of domains D, as illustrated in FIG. 3A. Accordingly, a plurality of domains D are automatically generated by applying an electric field to the liquid crystal 13. This makes it possible to automatically allocate a plurality of domains D, each of which is formed of the homogeneously aligned liquid crystal molecules having the same tilting angle, to each pixel.

Thus, a sharp and asymmetrical change in the contrast in the vertical direction is reliably alleviated and then becomes symmetrical, thereby inhibiting the inversion of halftones. It is thus possible to obtain a liquid crystal display unit exhibiting wider viewing angles.

The viewing angle dependency generated by TN-mode liquid crystal display units generally originates from a great difference in the refractive index Δn between homogeneously aligned liquid crystal molecules and orthogonally aligned liquid crystal molecules located between the substrates. Accordingly, the viewing angle dependency can be lowered by decreasing the difference in the refractive index Δn. To achieve this, optical compensator films for decreasing the difference in the refractive index Δn, i.e., the phase plates 14 and 16, are preferably provided for the liquid crystal display unit of the present invention. The provision of the phase plates 14 and 16 makes it possible to obtain a much wider viewing angle (approximately 140°) and also to exhibit a brighter display. A liquid crystal display unit provided with phase plates according to the present invention exhibits a display 1.2 to 1.4 times as bright as typical TN-mode liquid crystal display units. Further, even a liquid crystal display unit without phase plates according to the present invention provides a viewing angle of about 100° in the vertical (up and down) direction and in the horizontal (left and right) direction, and a liquid crystal display unit provided with two phase plates is able to provide a viewing angle of 120° to 140°.

In the present invention, it is also possible to reduce the response time of the liquid crystal molecules, and more specifically, the response time can be reduced to 28 milliseconds (18 milliseconds when the pixel electrodes are on, and 10 milliseconds when the pixel electrodes are off) when the unit is driven at a voltage of 5.5 V.

The present invention is described in more detail through illustration of an example.

A Mo-made black matrix having a plurality of transparent apertures (each having dimensions of 30 $\mu$m×122 $\mu$m) shown in FIG. 2 was formed on a glass substrate. Gate wiring patterns, thin film transistors, ITO transparent pixel electrodes, and source wiring patterns were further formed on the black matrix with an interlayer insulating film made of silicon nitride. Further, the above wiring patterns, transistors, and electrodes were covered with a polyimide alignment film having a pretilt angle of 90°±1°. The thin film transistor array shown in FIG. 2 was thus produced. Moreover, a color filter, an ITO common electrode, and a polyimide alignment film having a pretilt angle of 90°±1° were deposited on another glass substrate. Then, a fluorine liquid crystal having a negative anisotropy of dielectric constant $\Delta\in$ of −2 to −3 was sealed between the two glass substrates. A liquid crystal display unit was thus produced.

Further, a conductive portion extended from the common electrode was formed at one end of one glass substrate, while a conductive portion extended from the black matrix was formed at one end of another glass substrate. Both conductive portions were then connected by an Ag paste electrode via a switch, thereby grounding the black matrix. In this liquid crystal display unit, the width and the length of the pixel electrode were set to be 34 $\mu$m and 126 $\mu$m, respectively.

Figure 4:
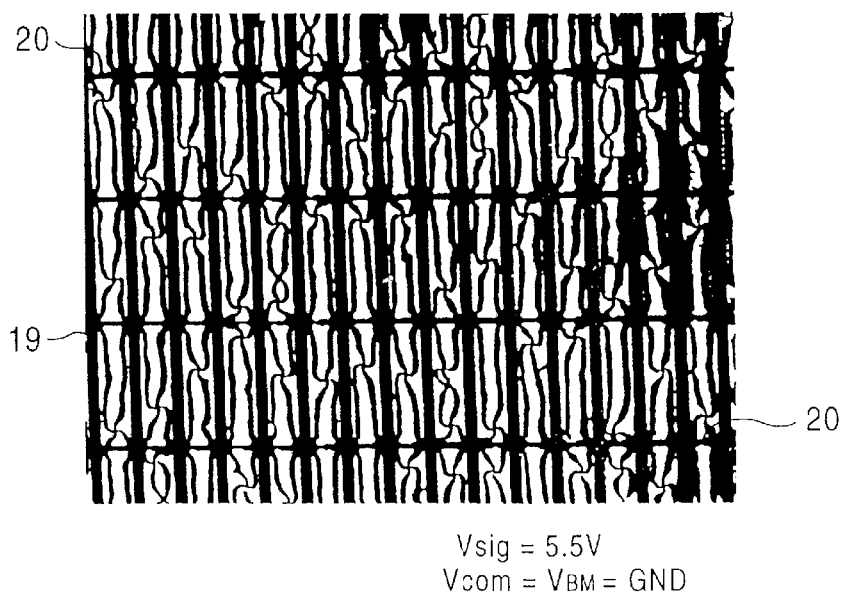
FIG. 4 illustrates a schlieren structure formed on pixel electrodes of a liquid crystal display unit according to the present invention.

FIG. 4 schematically illustrates a schlieren structure formed on each pixel after being photographed under a light microscope when the liquid crystal display unit manufactured as described above was driven under the following conditions: a voltage $V_{sig}$ at 5.5 V was applied to a pixel electrode, and both common electrode and black matrix were set to be at ground potential, i.e., 0 V.

FIG. 4 shows that a mesh pattern having black streaks occurs substantially diagonally in each longitudinal pixel as viewed from the top. Accordingly, it was confirmed that a schlieren structure was formed in each pixel.

Figure 5:
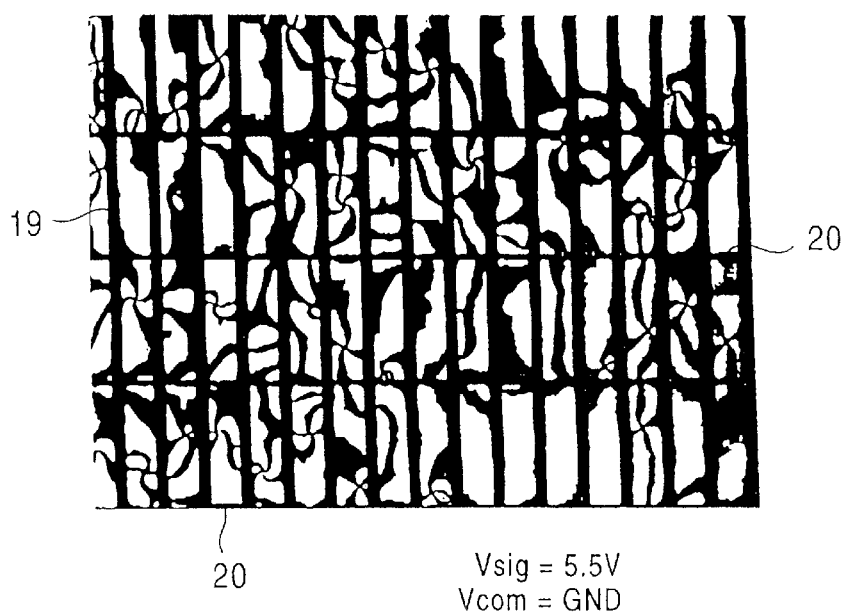
FIG. 5 is a plan view illustrating disclination lines which partition domains formed on pixel electrodes of a liquid crystal display unit used as a comparative example.

In contrast, a liquid crystal display unit was driven under the conditions of a voltage $V_{sig}$ at 5.5 V applied to a pixel electrode, a common electrode set to be at ground potential, i.e., 0 V, and a black matrix set in the floating state. Then, black streaks were detected in each pixel, as illustrated in FIG. 5, and it was confirmed that the liquid crystal molecules on the pixels were not uniformly aligned. The reason for this was because a schlieren structure was formed over a plurality of pixels. Thus, good viewing angle characteristics were not obtained by this liquid crystal display unit.

Subsequently, the viewing angle characteristics of the above liquid crystal display units were evaluated according to an Iso-REC (Reverse-image, Excessively-dark-image/bright-image, Contrast-Ratio) method.

The Iso-REC method is briefly explained below.

Figure 6:
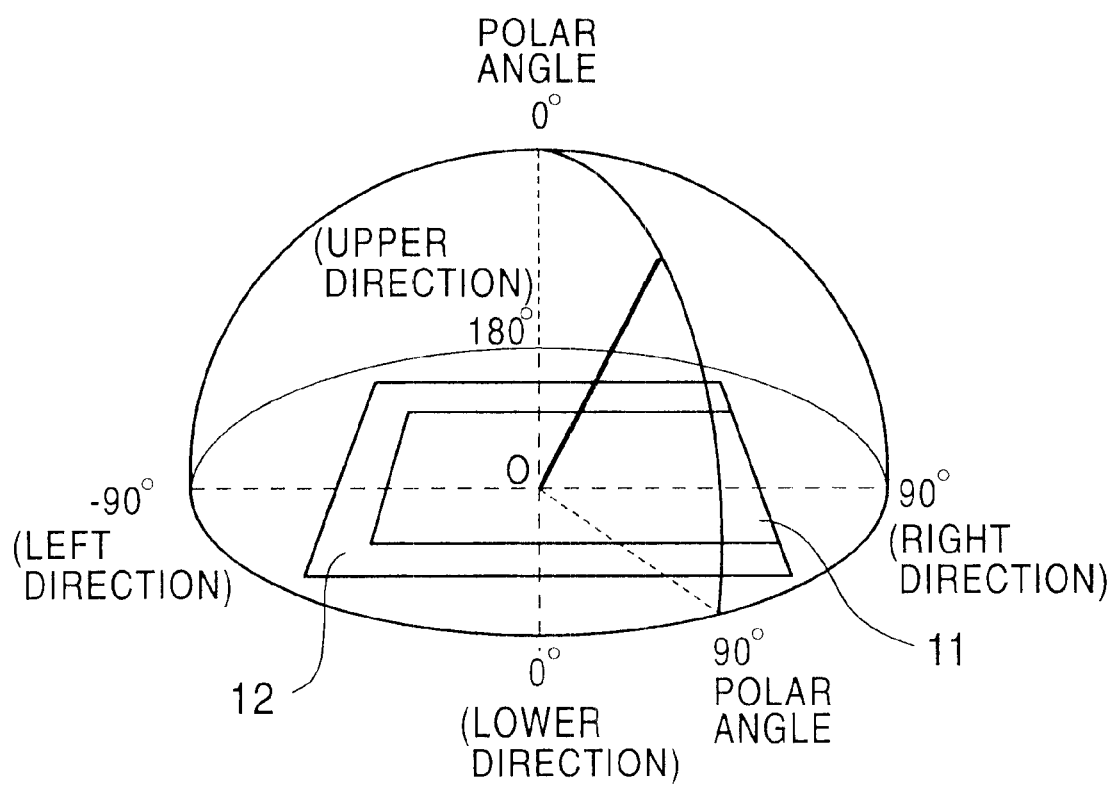
FIG. 6 illustrates polar coordinates used for evaluating the viewing angles of liquid crystal display units.

The center of the lower substrate 12 is first taken as an origin O, as shown in FIG. 6. A semi-sphere is then imagined around the origin O, and the direction of angles as viewed from the plane of the drawing are determined as follows. The proximal end (lower direction) is 0°; the right side (right direction) is 90°; the distal end (upper direction) is 180°; and the left side (left direction) is −90°. Thus, a display state obtained by observing a liquid crystal display screen from one of the above directions of this semi-sphere is detected.

The display screen of a typical TN-mode thin film transistor liquid crystal display unit is first observed from various directions. A normal display state is obtained as viewed from the front side. As viewed from the upper direction, however, a low contrast ratio is exhibited by the overall display, which is referred to as "white compression" (excessively bright image). On the other hand, as viewed from the lower direction, the overall display becomes dark, which is referred to as "black compression" (excessively dark image) if the incident angle is small. Further, the bright and dark portions of the display are reversed (reverse image) if the incident angle is greater. The above-described "white compression", "black compression", and "reverse image" are quantified, and the distribution of the quantified elements are illustrated. The foregoing procedure is known as the Iso-REC method.

Figure 7:
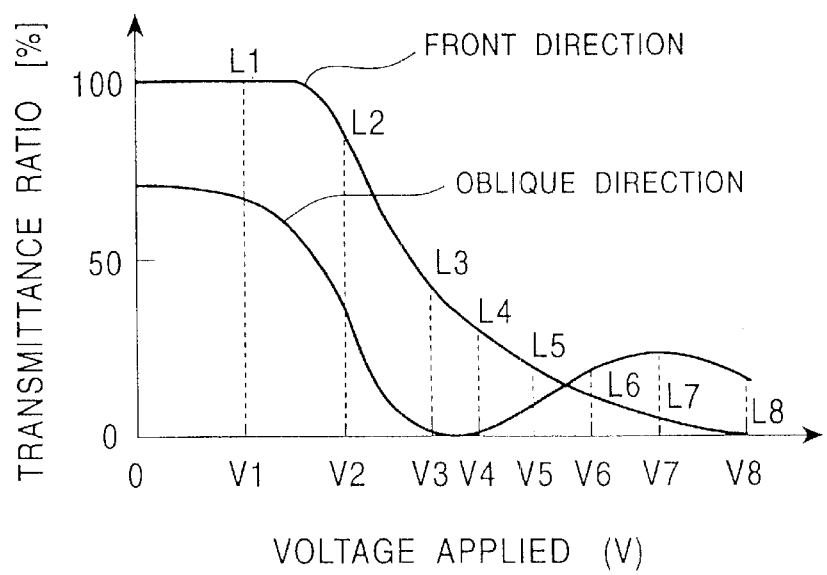
FIG. 7 is a diagram illustrating the relationship between the transmittance ratio and the voltage applied in a typical normally white-mode liquid crystal display unit.
Figure 8:
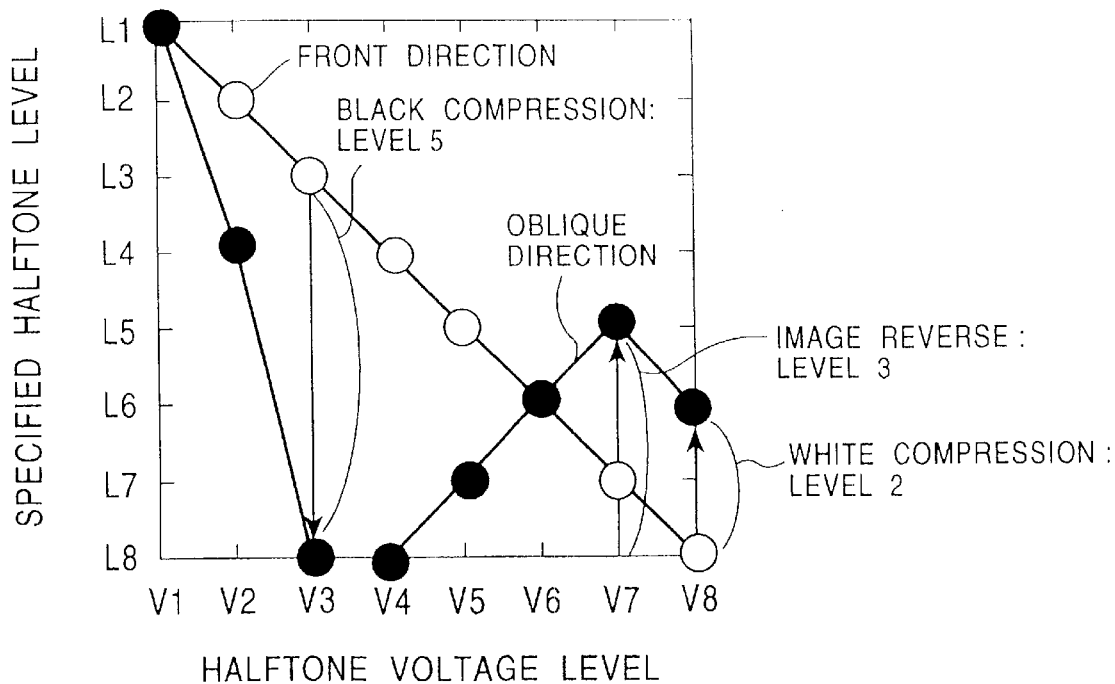
FIG. 8 is a diagram illustrating the relationship between the halftone voltage level and the specified halftone level of the liquid crystal display unit having the characteristics shown in FIG. 7.

FIG. 7 illustrates an example of the electro-optical characteristics of a normally white-mode TN liquid crystal display unit. FIG. 7 indicates that there is a difference in the transmittance ratio curve between the viewing angle in the front direction and the viewing angle in the oblique direction. More specifically, the transmittance ratio in the oblique direction is lower than that in the front direction in a voltage range from V1 to V6, and conversely, the transmittance ratio in the oblique direction is higher than that in the front direction at voltages of V6 and higher. In this characteristic diagram, the specified halftone levels determined by specifying the maximum transmittance ratios in the respective directions are obtained, and the halftone levels are plotted with respect to the voltage levels from V1 to V8. The plotted levels are shown in FIG. 8.

For example, upon application of a voltage of V3, although the specified halftone level in the front direction is L3, the halftone level in the oblique direction is L8. Accordingly, the display as viewed from the oblique direction is darker than that as viewed from the front direction. It is thus proved that "black compression"occurs in the display when a voltage of V3 is applied. The magnitude of "black compression"is determined to be level 5 because the halftone level changes from L3 to L8. In this manner, the magnitude of "black compression" is counted with respect to all the halftone levels from L1 to L8, and the maximum value is determined to be the magnitude of "black compression" at a specific angle.

The same calculation applies to "white compression". For example, upon application of a voltage of V8, although the specified halftone level in the front direction is L8, it increases to L6 in the oblique direction. It is thus judged that "white compression" occurs, and the magnitude of "white compression" is determined to be level 2. Further, it is determined that "reverse image" occurs when the halftone level decreases with increase in the voltage level and reaches the minimal value at a given voltage level, and then starts to increase again. The magnitude of "reverse image" is indicated by the maximum amount of the re-increased halftone level. In this case, the reverse image level is 3.

The above-described abnormalities occurring in the display are quantified by each factor, as discussed above, which are then indicated on the polar coordinates of the viewing angles.

Figure 9:
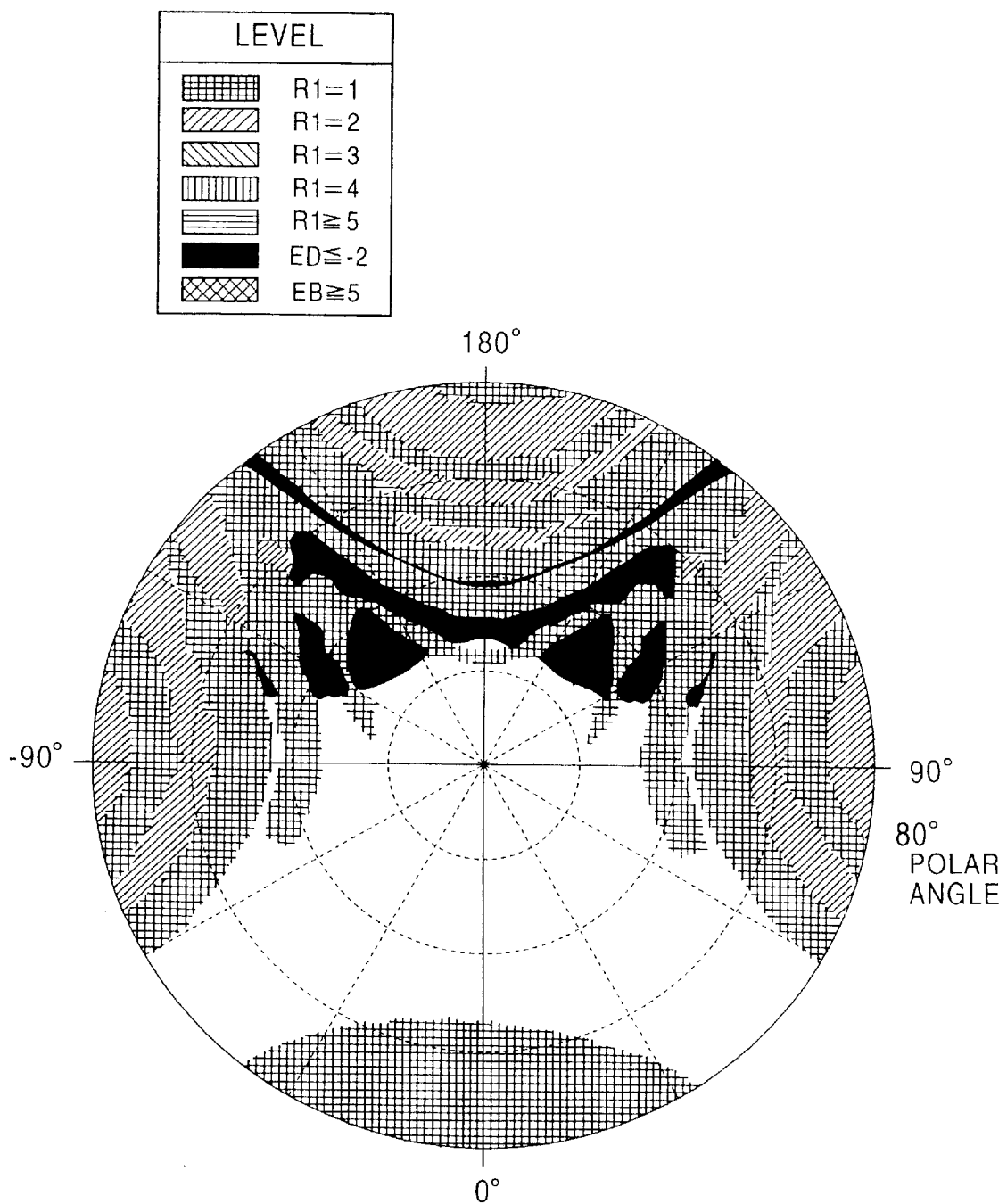
FIG. 9 illustrates polar coordinates representing a display state of a liquid crystal display unit used as a comparative example indicated according to the Iso-REC method when the black matrix is set in the floating state and the common electrode is grounded.

In the liquid crystal display unit produced above, the switch is released to disconnect the common electrode and the black matrix. FIG. 9 illustrates a normal display area and an abnormal display area of the above liquid crystal display unit indicated on polar coordinates according to the Iso-REC method. In the polar coordinates, "white compression" is represented by EB, "black compression" is indicated by ED, and "reverse image" is designated by RI. In FIG. 9, the lattice portion indicating RI=1, the hatched portions indicating RI=2 and 3, the perpendicular line portion designating RI=4, and the horizontal line portion designating RI=5 represent "reverse image", and the numbers indicate the magnitude of "reverse image". The portion filled in black indicating ED designates "black compression", while the meshed portion indicating EB represents "white compression". The blank portions indicate normal display areas.

As is seen from FIG. 9, in the liquid crystal display unit in which the black matrix is not at the same potential as the common electrode but is set in the floating state, "black compression" occurs in a specific direction at a shallow angle. Thus, the viewing angle of this display unit is, in general, extremely small in a specific direction.

Figure 10:
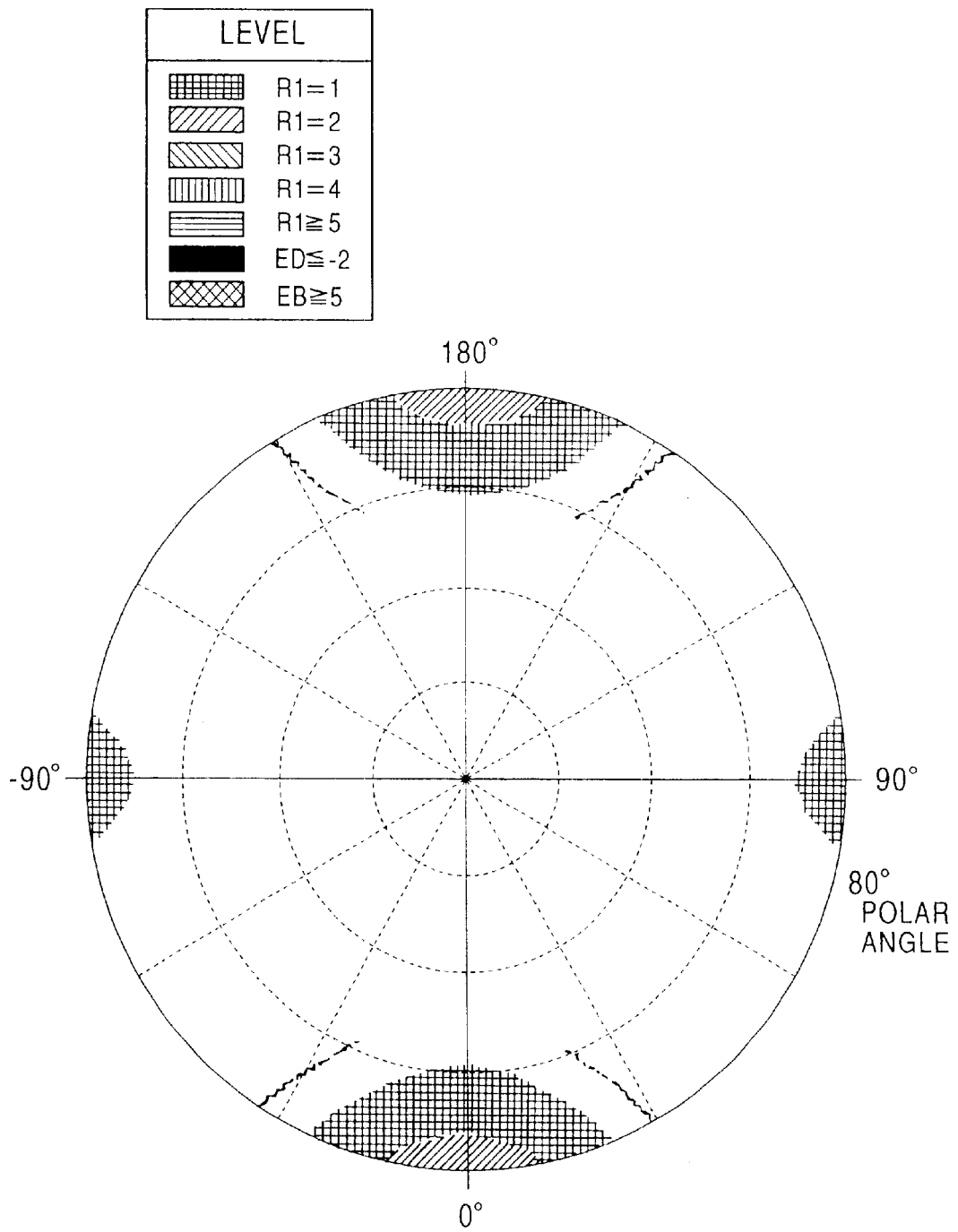
FIG. 10 illustrates polar coordinates representing a display state of a liquid crystal display unit of the present invention indicated according to the Iso-REC method when both black matrix and common electrode are grounded.

In the liquid crystal display unit produced above, the black matrix is connected to the common electrode by a switch so that the two elements are at the same potential. Further, phase plates are provided on the exterior sides of the glass substrates. FIG. 10 illustrates a normal display area and an abnormal display area of the above liquid crystal display unit indicated on polar coordinates according to the Iso-REC method.

Comparing FIG. 10 to FIG. 9, it is obvious that the normal display area is extended in all directions, thus increasing the viewing angles when the black matrix and the common electrode are set at the same potential by being connected. Moreover, "black compression" in the upper direction is totally eliminated, and "reverse image" is significantly reduced.

Figure 11:
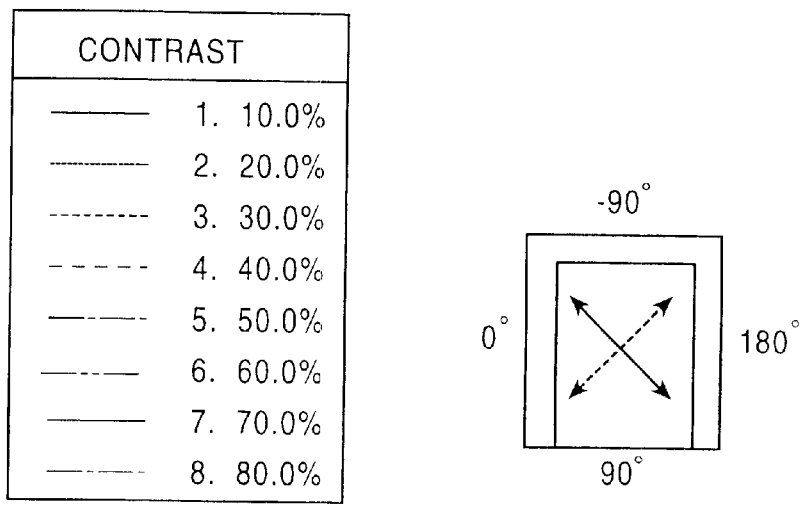
FIG. 11 illustrates iso-contrast curves of a liquid crystal display unit of the present invention without having phase plates when both black matrix and common electrode are grounded.
Figure 11:
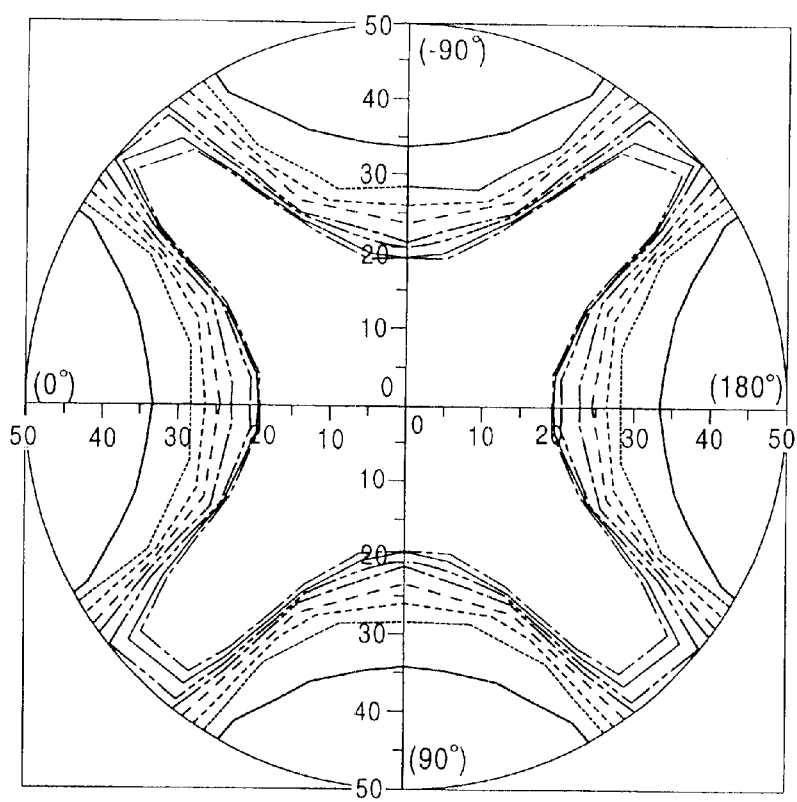

FIG. 11 illustrates typical iso-contrast curves on the display of a liquid crystal display unit which is not provided with phase plates and in which the black matrix and the common electrode are not connected. FIG. 11 reveals that multi-domain-type typical iso-contrast curves are obtained.

It is thus seen that wider viewing angles are obtained by setting the black matrix to a ground potential.

Figure 12:
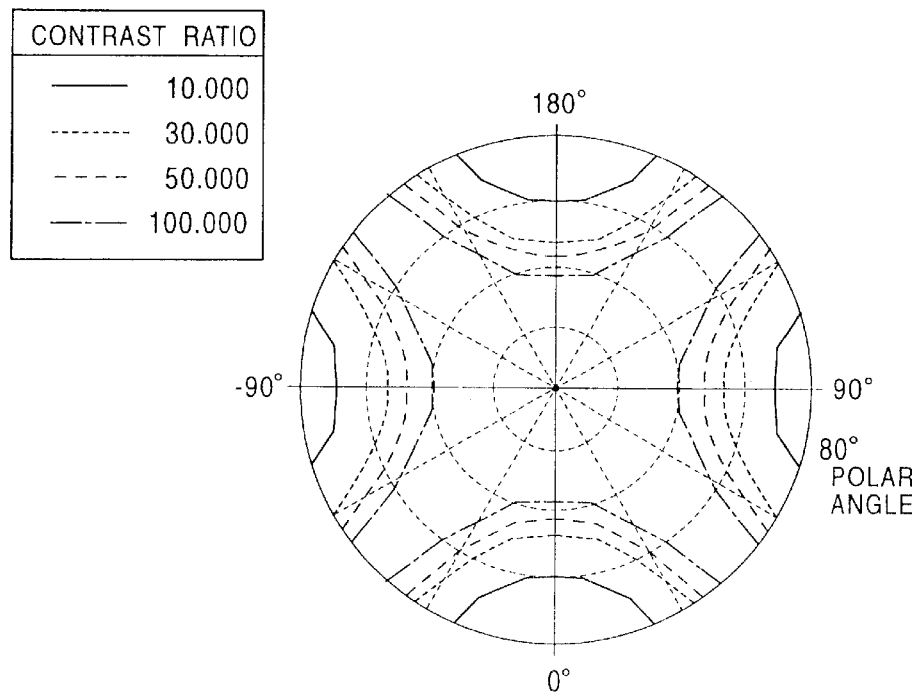
FIG. 12 illustrates iso-contrast curves of a liquid crystal display unit of the present invention provided with phase plates when both black matrix and common electrode are grounded.
Figure 13:
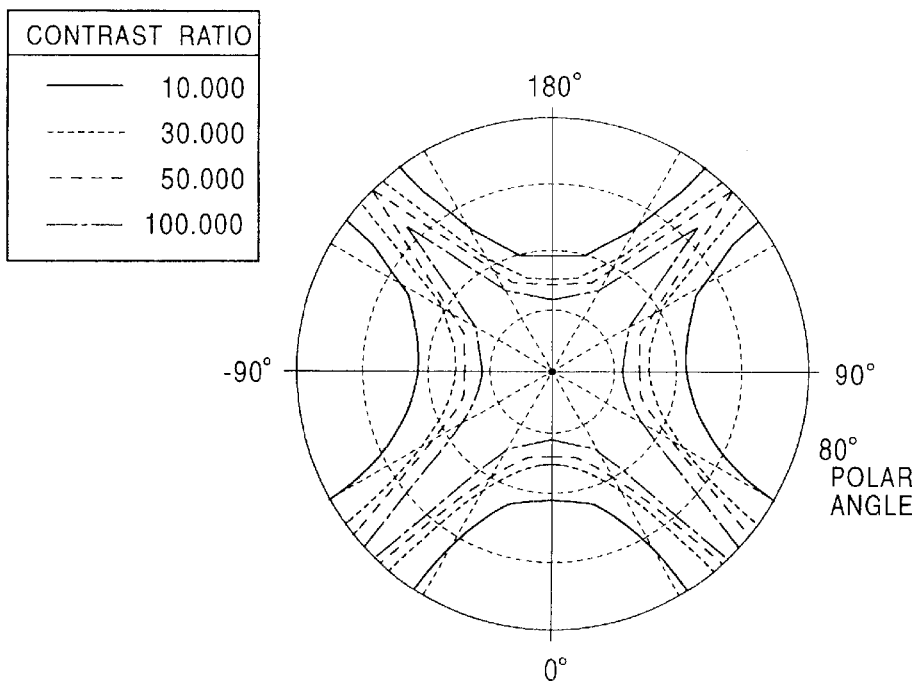
FIG. 13 illustrates iso-contrast curves of a liquid crystal display unit used as a comparative example when the black matrix is set in the floating state and the common electrode is grounded.
Figure 14:
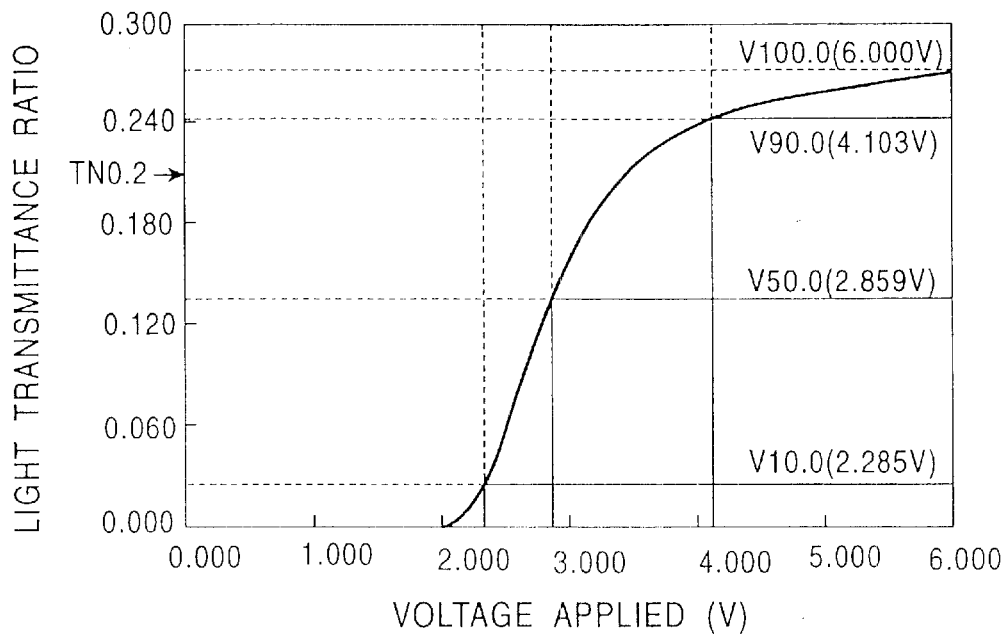
FIG. 14 is a diagram illustrating the relationship between the transmittance ratio and the voltage applied in a liquid crystal display unit of the present invention provided with phase plates when both black matrix and common electrode are grounded.
Figure 15:
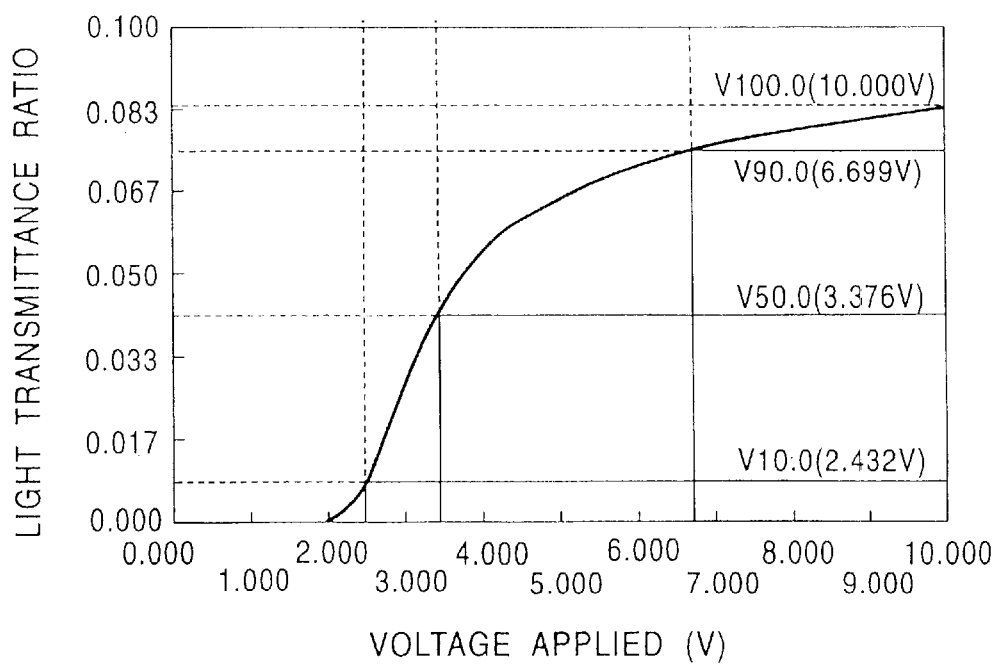
FIG. 15 is a diagram illustrating the relationship between the transmittance ratio and the voltage applied in a liquid crystal display unit used as a comparative example when the black matrix is set in the floating state and the common electrode is grounded.
Figure 16:
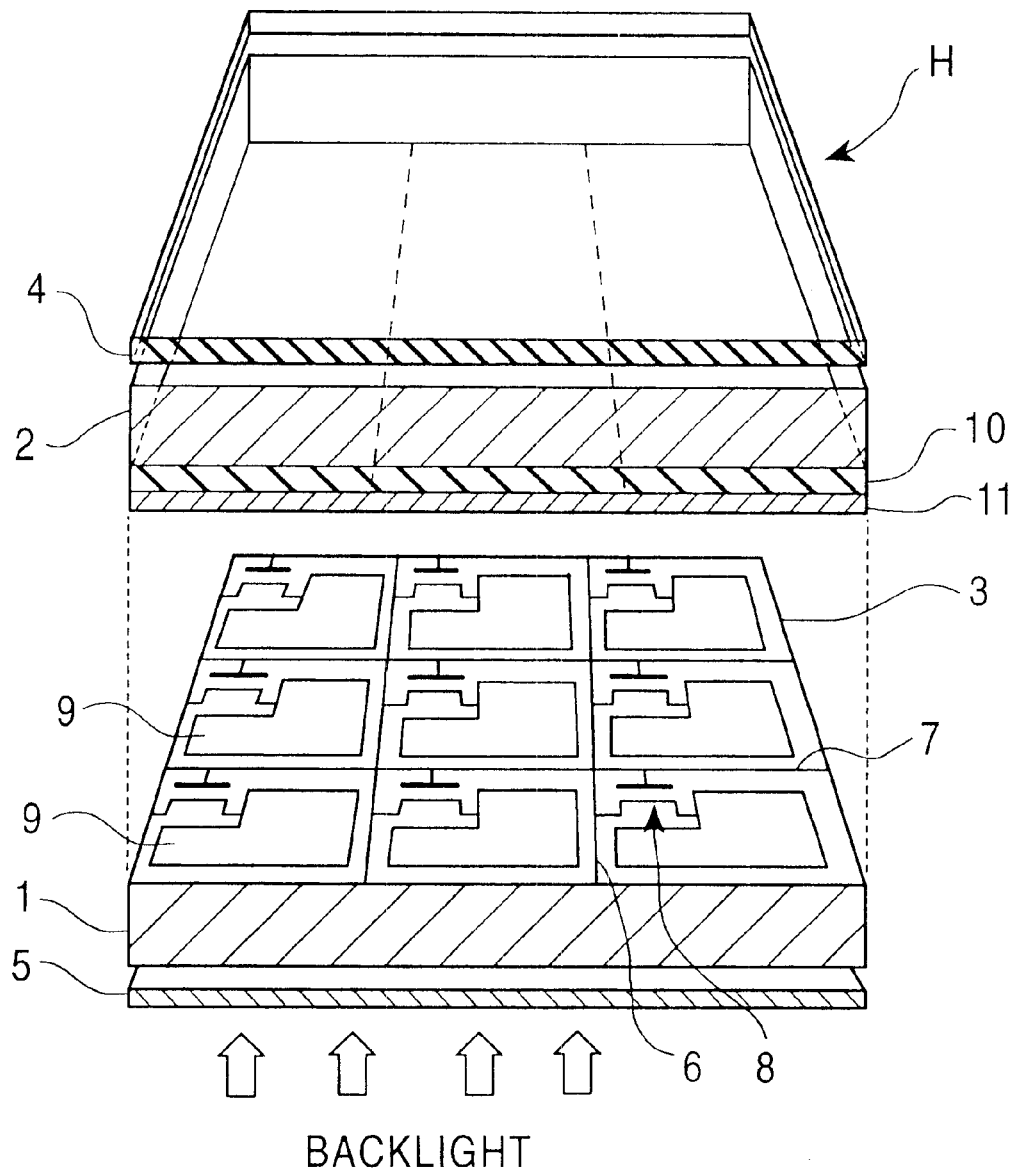
FIG. 16 is an exploded perspective view illustrating an example of known liquid crystal display units.
Figure 17:
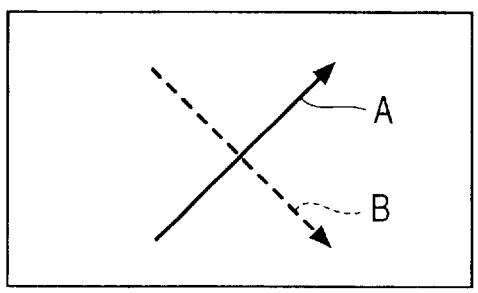
FIG. 17 illustrates the rubbing directions of a conventional liquid crystal display unit.
Figure 18:
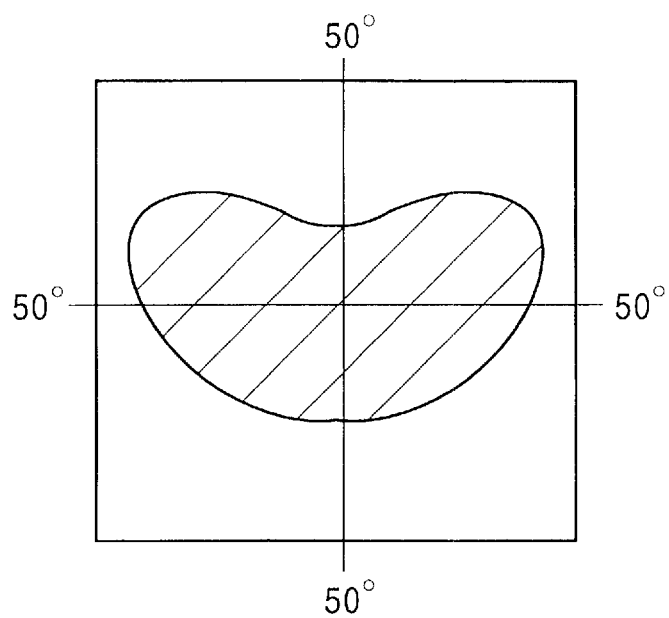
FIG. 18 illustrates iso-contrast curves of a known liquid crystal display unit.
Figure 18:
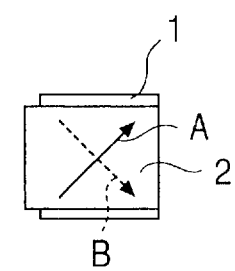

FIG. 12 illustrates iso-contrast curves of the liquid crystal display unit of the present invention having the characteristics shown in FIG. 10. FIG. 13 illustrates iso-contrast curves of the liquid crystal display unit, used as a comparative example, having the characteristics shown in FIG. 9. FIGS. 12 and 13 reveal that the liquid crystal display unit of the present invention exhibits wider viewing angles over the comparative example. FIG. 12 also shows that a contrast of a viewing angle of approximately 120° in the vertical direction and approximately 140° in the horizontal direction is obtained. FIG. 14 illustrates the relationship between the light transmittance ratio and the voltage applied in the liquid crystal display unit of the present invention having the characteristics shown in FIG. 10. FIG. 15 illustrates the relationship between the light transmittance ratio and the voltage applied in the liquid crystal display unit, used as a comparative example, having the characteristics shown in FIG. 9. Comparing FIG. 14 to FIG. 15, the transmittance ratio soars at a lower voltage in the liquid crystal display unit of the present invention, and thus, low power driving is possible in the liquid crystal display unit of the present invention. "TN 0.2" shown in FIG. 14 indicates the light transmittance ratio of a typical TN-mode liquid crystal display unit. Accordingly, a higher transmittance ratio can be obtained by application of the present invention over that of a TN-mode liquid crystal display unit.

As is seen from the foregoing description, the liquid crystal display unit of the present invention offers the following advantages.

The alignment of a liquid crystal is controlled in the following manner. Liquid crystal molecules are substantially orthogonal to the substrates when a voltage is not applied, and upon application of a voltage, the liquid crystal molecules are homogeneously aligned parallel to the substrates. The alignment films which sandwich the liquid crystal therebetween are not specifically processed for alignment of the liquid crystal but only provided with a pretilt angle of approximately 90°=1°. Accordingly, it is not necessary for the liquid crystal molecules to be tilted in a specific direction when a voltage is applied. Instead, the liquid crystal molecules are aligned by being tilted in any given direction, thereby making it possible to form a plurality of domains.

Moreover, a liquid crystal having a negative dielectric constant may be used, and a conductive light-shielding member (black matrix) may be set substantially at the same potential as the common electrode. Then, electric lines of force produced by an electric field generated from pixel electrodes are radially distorted to the peripheral portions of the pixel electrodes while being attracted to the light-shielding members surrounding the pixel electrodes. Accordingly, the liquid crystal molecules are aligned perpendicularly to the extended electric lines of force, resulting in the formation of a plurality of domains for each pixel. The liquid crystal molecules are thus homogeneously aligned having slightly different tilted angles for the individual domains.

Therefore, a sharp and asymmetrical change in the contrast in the vertical direction of the liquid crystal display unit is reliably alleviated and then becomes symmetrical, thereby suppressing the inversion of halftones. It is thus possible to provide a liquid crystal display unit having wider viewing angles.

Further, the alignment films which are not specifically processed for alignment of a liquid crystal, i.e., which are not rubbed, suffice in the present invention. The rubbing operation generating dust is not required, thereby preventing defects generated by rubbing. Moreover, in a conventional structure in which the orientations of alignment of liquid crystal molecules are differentiated between a plurality of regions of each pixel, it is necessary that each pixel is divided into a plurality of domains, and the divided domains are then rubbed. This requires a highly precise rubbing technique. In the present invention, however, the rubbing operation is made unnecessary, thereby simplifying the manufacturing process and improving the yield.

What is claimed is:

1. A liquid crystal display unit comprising:
   a first substrate and a second substrate disposed to face each other;
   a liquid crystal having a negative dielectric anisotropy disposed between said first substrate and said second substrate;
   a common electrode on the first substrate;
   a first alignment film on the first substrate, the first alignment film having a pretilt angle of 90°±1° and not rubbed, said common electrode and said first alignment film being sequentially disposed on a surface of said first substrate facing said second substrate;

a plurality of pixel electrodes on said second substrate to cover a display area of said liquid crystal;

a conductive light-shielding member disposed on said second substrate and positioned around each of said plurality of pixel electrodes in a non-display area of said liquid crystal while being electrically insulated from said pixel electrode, said conductive light-shielding member being continuously grounded;

a second alignment film having a pretilt angle of 90°±1° and not rubbed, the second alignment film being disposed on said pixel electrodes and on said conductive light-shielding members, the first and second alignment films inducing a long axis of molecules of the liquid crystal to be aligned perpendicularly to a thickness direction of the alignment films when an electric field is not applied between said common electrode and said pixel electrode.

2. A liquid crystal display unit according to claim 1, wherein an optical compensator is provided for at least one of said first and second substrates.

3. A liquid crystal display unit according to claim 1, said first and second alignment films comprising polyimide.

4. A liquid crystal display unit according to claim 1, said conductive light-shielding member comprising one of Cr and Mo.

* * * * *